Patented Feb. 7, 1939

2,146,596

UNITED STATES PATENT OFFICE 2,146,596

RUBBER INSULATING COMPOUND AND METHOD OF MAKING THE SAME

Emil W. Schwartz, Bridgeport, and Manuel H. Savage and Francis C. Spargo, New Haven, Conn., assignors to General Electric Company, a corporation of New York No Drawing. Application September 16, 1936, Serial No. 101,076

8 Claims. (Cl. 106—13)

The present invention relates broadly to an improved rubber insulating compound and to a method of making the same. More particularly it relates to, and has as a principal object to provide a rubber composition for insulating electrical conductors and cables that possesses improved resistance to aging and is heat-resisting for a prolonged period of time at elevated temperatures, for example, at temperatures of the order of about 75° to 85° C. (that is, has heat-resisting and super-aging properties such as possessed by the rubber compound described and claimed in our copending application, Serial No. 101,074, and which, in addition thereto, has the superior moisture-resisting properties of the rubber insulating compound made as described and claimed in the copending application, Serial No. 101,075, of E. W. Schwartz and E. T. Croasdale, each of these applications being assigned to the same assignee as the present invention). The characteristic super-aging and heat- and moisture-resisting properties of our new and improved rubber insulating compound are due mainly to the particular ingredients and proportions thereof that are used in its manufacture. The marked resistance to moisture of the product of this invention is obtained by using deproteinized rubber in place of the ordinary crude rubber of commerce.

Prior to this invention known rubber insulating compounds that possessed low water-absorbing properties were not practically successful for insulating electrical conductors and cables operating at conductor temperatures ranging around 75° C., due to the excessive deteriorating action of such temperatures upon the insulation.

The present invention provides a rubber insulating compound which not only effectively withstands elevated conductor temperatures for a prolonged service period, but also resists moisture to an outstanding degree, absorbing less than 0.010 gram of water per square inch of exposed surface area after immersion for 7 days in distilled water maintained at a temperature of 69° to 71° C.

It has been known heretofore that rubber can be deproteinized, that is, substantially freed of proteins, and that the use of deproteinized rubber in rubber compounding improves the water-resisting properties of the vulcanized or unvulcanized end-product. We make no broad claim to the use of deproteinized rubber as an ingredient of any rubber compound. We do, however, claim as new and novel the production of a particular rubber compound having properties peculiar only to itself by the use of deproteinized rubber, preferably in an amount within a particular range of proportions, which rubber is compounded with other ingredients of the kind and in the amount hereinafter specified.

The novel features which are characteristic of our invention are set forth in the appended claims. The invention itself, however, will best be understood from the following specification:

Rubber insulating compound produced in accordance with this invention comprises deproteinized rubber in an amount such, for instance, as about 33 per cent by weight and the remainder consisting of finely divided zinc oxide, finely divided inert filler, anti-oxidant, plasticizer and an organic accelerator capable of yielding nascent sulfur at vulcanization temperatures, for example, a thiuram polysulfide. More particularly, it consists essentially of materials of the kind just described advantageously combined in the following proportions:

| | Parts by weight |
|---|---|
| Deproteinized rubber | 33.0–38.0 |
| Finely divided zinc oxide | 28.0–33.0 |
| Finely divided inert filler | 26.0–31.0 |
| Anti-oxidant | 1.0– 3.0 |
| Plasticizer | 0.5– 2.5 |
| Thiuram polysulfide | 1.0– 2.5 |

Advantageously, the finely divided zinc oxide and inert filler used with other ingredients, in making the rubber compound of this invention is dried to remove free moisture prior to use.

If desired a small amount, for example, about 0.5 to 3.0 parts by weight, of carbon black, for instance, such carbon blacks as those known to the trade as "P33", "Gastex", and "Micronex" (and preferably the softer blacks such as "P33" or "Gastex"), may be a part of the finely divided inert filler of the foregoing formula, the remainder of the inert filler advantageously being clay of a kind used in rubber compounding.

Fillers or filling materials are those substances in powder form that are incorporated in rubber compounds for the purpose of increasing the bulk of the compound. They are usually inert substances which generally produce strengthening effects on the vulcanized compound. In the preparation of rubber insulation for wires and cables, the kind and amount of filler have a material influence upon the properties of the end-product. Examples of inert fillers that may be used in practicing this invention are whiting, blanc fixe, clay and asbestine.

In rubber compounding certain finely divided substances or fillers which, when properly dispersed in rubber, provide the vulcanized product with improved physical properties, for example, greater energy of resilience, greater resistance to abrasion, higher modulus of elasticity and tensile strength, are often described as "reinforcing agents." Examples of such substances are zinc oxide, channel carbon black and so-called "soft blacks". Magnesium carbonate in an amount up to about 5 per cent by weight of the whole may also be used. Higher amounts of magnesium carbonate detrimentally affect the useful physical properties of a rubber compound, for example, by stiffening the compound excessively. Substances of the kind just stated comprise a part of the total filler content of the rubber compound produced by this invention. We use zinc oxide as one of such substances both to activate the particular thiuram polysulfide employed as an accelerator of vulcanization and to add strength and heat resistance to the end-product.

An anti-oxidant is a substance that inhibits or retards oxidation catalytically or by preferential absorption of oxygen. Anti-oxidants used in rubber compounding are usually synthetic organic substances. Use of an anti-oxidant in practicing this invention aids in obtaining a rubber insulating compound of maximum super-aging and heat-resisting properties. Examples of anti-oxidants that may be used in preparing our improved rubber insulating composition are those known to the trade as "Neozone D", "Neozone E", "Antox" and "B. L. E." "Neozone D" is phenyl-beta-naphthylamine; "Neozone E" consists of about 75 per cent phenyl-beta-naphthylamine and about 25 per cent meta-toluylenediamine oxalate; "Antox" and "B. L. E." are aldehyde-amine reaction products.

An accelerator is any substance that hastens the vulcanization of rubber, causing it to take place in shorter time or at lower temperature or both. According to potency, or speed of action, accelerators are commonly classified by those skilled in the art as slow, medium, semi-ultra, and ultra accelerators. Thiuram polysulfides are referred to by the trade as ultra accelerators, but actually they are rapid accelerators of vulcanization only in the presence of added sulfur. Thiuram polysulfides, for example, tetra-methyl-thiuram disulfide, known to the trade as "Tuads," and di-pentamethylenethiuram tetrasulfide, known to the trade as "Tetrone A" split off nascent sulfur at vulcanization temperatures. The rubber compound of this invention therefore is cured without the addition of any other free sulfur, producing vulcanizates that are non-tarnishing to metallic conductors and super-resistant to aging and heat. It is our theory that at least a part of the marked improvement in the useful properties of our rubber compound, for example, its outstanding heat-resisting characteristics, is due to the slow, uniform cure obtained by using a thiuram polysulfide in compounding. As a result the rubber continues to cure, and reaches an optimum cure, after the material is in service use.

Substances which soften a rubber compound and make it easier to mold or extrude are commonly known as plasticizers. Examples of plasticizers which may be used in practicing this invention, and which are mentioned for purpose of illustration only, are stearic acid, zinc laurate, vegetable oils such as palm oil, China-wood oil, linseed oil and the like, mineral oils and waxes, et cetera. Such substances also generally function as dispersing agents.

For plasticizing the rubber, as a means for promoting the rapid and uniform dispersion of the solid ingredients throughout the mass, and as a lubricant of the dies during the application of the rubber compound to a conducting core by extrusion means, we have found a combination of paraffin wax and stearic acid to be particularly effective. Thus, in a formula such as the one immediately hereinafter given, that material which for brevity we herein collectively designate as "plasticizer" may consist of 1.0 part of paraffin wax and 0.25 part of stearic acid. Green ozokerite, after being strained to free it of impurities, is also a suitable plasticizer. It may be used either alone or mixed with paraffin wax. Thus we may use as a plasticizer a mixture of ozokerite and stearic acid, or a mixture of ozokerite, paraffin wax and stearic acid.

In order that our invention may be more fully understood and practiced by those skilled in the art to which it pertains, the following specific example thereof is given, it being understood that it is merely illustrative in nature:

|  | Parts by weight |
|---|---|
| Deproteinized rubber | 36.0 |
| Finely divided zinc oxide | 28.0 |
| Finely divided clay | 25.0 |
| Finely divided whiting | 4.5 |
| Carbon black | 1.25 |
| Plasticizer | 1.25 |
| Anti-oxidant | 2.5 |
| Tetra-methyl-thiuram disulfide | 1.5 |

About 70 per cent of the total deproteinized rubber of a particular batch is first ground in a suitable machine, for example, a Banbury mixer, for about 3 minutes. The other ingredients, except the remainder of the deproteinized rubber and the tetra-methyl-thiuram disulfide, are put into the mixer and the mixing continued for another period of about 7 minutes. The remainder of the deproteinized rubber is now added and the whole mixed for a further period, say, about 10 minutes. The mass is then mixed on a rubber mill for about 5 minutes, after which it is strained and then aged for a few days. When ready to use, the tetra-methyl-thiuram disulfide is added to the stock prepared in the manner described, and the whole thoroughly mixed on a mill.

The stock is extruded in well-known manner on conductors by means of standard tubing practice; or it may be sheeted on a calendar and applied in the form of a tape to an electrical conductor or cable which may be conveniently insulated by such means. The rubber insulation is then vulcanized in place on the conductor. In the case of a No. 14 (0.064 inch diameter) copper conductor covered with a 3/64-inch wall of rubber, the rubber compound may be vulcanized by employing, for example, a 45-minute rise to about 25 to 35 pounds steam pressure (130.5° to 138.3° C.) and a 45-minute cure at such steam pressure, plus or minus 15 minutes variation either in the time in reaching the desired curing temperature or in the time of curing at such temperature, or in both the time in reaching the curing temperature and in the time of curing thereat. As is well known to those skilled in the art, the time required for effectively curing rubber insulation in place on electrical conductors depends both upon the wall thickness of the rubber and the diameter of the conductor. The greater the wall thickness and the diameter of the conductor, the longer is the curing time required.

In producing the rubber insulating compound and insulated conductor of this invention we prefer to use natural rubber that has been deproteinized and otherwise treated to improve it, in a manner such as disclosed and claimed in the copending application, Serial No. 147,990 of E. W. Schwartz and E. T. Croasdale, filed June 12, 1937, which application is a division of Schwartz and Croasdale application Serial No. 101,075, filed concurrently herewith, and both of which applications are assigned to the same assignee as the present invention.

The superior and characteristic properties of rubber compound produced in accordance with this invention will immediately be appreciated by those skilled in the art from the following description of the product, based on the results of tests made by methods approved by the trade.

A 2-inch mark on a 6-inch test piece of a rubber compound made as herein described stretches at least 400 per cent before breaking. The set in a 2-inch mark on a 6-inch test piece one minute after release is not greater than ⅜ inch. The initial tensile strength of the compound is at least about 1500 pounds per square inch. The procedures for making elongation, set and tensile strength tests are described under specification D-27-35T of the American Society for Testing Materials. The product conforms in all respects to the electrical requirements of a rubber insulation as set forth in said specification D-27-35T.

Further, when a sample of the vulcanized rubber compound has been subjected to a temperature of 120° C. in an air oven for a period of 120 hours at atmospheric pressure, its tensile strength is at least about 1200 pounds per square inch and its elongation not less than about 300 per cent; and when subjected to the Bierer-Davis oxygen-bomb test for 21 days under a pressure of 300 pounds per square inch and at 70° C., it shows a depreciation from that of the original compound of not more than 25 per cent in elongation and in tensile strength.

The low moisture-absorbing properties of a compound produced in accordance with this invention may be established in the following manner:—

A 12-inch length of the insulated conductor, with all coverings removed, is bent in the shape of a U. The ends of the sample are inserted in the holes of a stopper that fits tightly a receptacle filled with distilled water. The insulated conductor is so adjusted that a length of 9 inches is submerged in the distilled water when the stopper is inserted in the container. After immersion for 7 days in the distilled water, which is maintained at a temperature of 69° to 71° C., the sample is removed, wiped free of surface water and weighed. It will be found that the increase in the weight (moisture-absorption factor) of the rubber insulation is less than 0.010 gram per square inch of the exposed surface area.

The distinguishing and valuable properties of our rubber compounds are further shown by the following: When a sample of a vulcanized rubber composition of this invention is subjected to an air-bomb test for 20 hours under an air pressure of 80 pounds per square inch and at a temperature of about 126.7° C. (260° F.), it shows a depreciation from that of the original compound of not more than 25 per cent in elongation and in tensile strength. And when a product of this invention is placed in an air bomb and therein subjected to 80 pounds air pressure for five hours at about 148.9° C. (300° F.), its maximum depreciation from the original in elongation and in tensile strength, after this more rigid test, is likewise not more than 25 per cent. In making this test the bomb is preheated to the test temperature, the sample or samples placed therein, and the aging time recorded from the time the bomb reaches test temperature, which time is usually less than 10 minutes.

Tests such as those just described are tests, the results of which are indicative of the useful life of a rubber compound or of its usefulness for a particular purpose. As those skilled in the art will understand, rubber compounds having the properties just described not only have increased usefulness in old applications but also utility in new fields.

The following more specific data are given as illustrative of the improved properties of rubber compounds produced in accordance with this invention:

*Oxygen-bomb test, 70° C., 300 lbs. per sq. in. pressure*

| Product | With wire | | | | Without wire | | | |
| --- | --- | --- | --- | --- | --- | --- | --- | --- |
| | Tensile strength in lbs./sq. in. | Percent elongation | Percent depreciation— | | Tensile strength in lbs./sq. in. | Percent elongation | Percent depreciation— | |
| | | | In tensile strength | In elongation | | | In tensile strength | In elongation |
| Vulcanized rubber compound made in accordance with this invention | 2,302 | 510 | | | 2,291 | 510 | | |
| Same compound after 504 hours in oxygen bomb | 2,070 | 470 | 10 | 7.8 | 1,879 | 410 | 18 | 19.6 |
| Ordinary vulcanized rubber insulating compound before testing | 1,643 | 420 | | | 1,643 | 420 | | |
| Same compound after 192 hours in oxygen bomb | 885 | 410 | 46.1 | 2.4 | 933 | 410 | 43.2 | 2.4 |

*Geer air oven test at 120° C. for 120 hours*

| Product | Tensile strength in lbs./sq. in. | Percent elongation | In tensile strength | In elongation | | | | |
| --- | --- | --- | --- | --- | --- | --- | --- | --- |
| Vulcanized rubber compound made in accordance with this invention | 2,302 | 510 | | | | | | |
| Same compound after 120 hours in air oven | 2,076 | 460 | 9.8 | 9.8 | | | | |

*Geer air oven test at 75° C.*

| Product | With wire | | | | Without wire | | | |
|---|---|---|---|---|---|---|---|---|
| | Tensile strength in lbs./sq. in. | Percent elongation | Percent depreciation— | | Tensile strength in lbs./sq. in. | Percent elongation | Percent depreciation— | |
| | | | In tensile strength | In elongation | | | In tensile strength | In elongation |
| Vulcanized rubber compound made in accordance with this invention | 2,302 | 510 | | | 2,302 | 510 | | |
| Same compound after 10 days in Geer oven at 75° C | 2,711 | 500 | +17.7 | 1.96 | 2,274 | 485 | 1.2 | 4.9 |
| Same compound after 20 days in Geer oven at 75° C | 2,435 | 470 | +5.78 | 7.8 | 2,439 | 465 | +6.2 | 8.8 |
| Same compound after 30 days in Geer oven at 75° C | 2,413 | 485 | +4.8 | 4.9 | 2,520 | 460 | +9.5 | 9.8 |
| Same compound after 40 days in Geer oven at 75° C | 2,380 | 470 | +3.4 | 7.8 | 2,342 | 460 | +1.9 | 9.8 |
| Ordinary vulcanized rubber insulating compound before testing | | | | | 1,646 | 460 | | |
| Same compound after 10 days in Geer oven at 75° C | | | | | 1,012 | 395 | 38.3 | 14.0 |
| Same compound after 20 days in Geer oven at 75° C | | | | | 717 | 375 | 56.5 | 18.5 |
| Same compound after 30 days in Geer oven at 75° C | | | | | 542 | 220 | 69.0 | 52.3 |
| Same compound after 40 days in Geer oven at 75° C | | | | | 475 | 140 | 71.0 | 69.5 |

*Air-bomb test at 126.7° C. (260° F.) under 80 lbs. air pressure for 20 hours*

| Product | Tensile strength | Percent elongation | In tensile strength | In elongation |
|---|---|---|---|---|
| Vulcanized rubber compound made in accordance with this invention | 2,175 | 485 | | |
| Same compound after 20 hours in air bomb at 126.7° C., 80 lbs. air pressure | 2,028 | 445 | 6.76 | 8.2 |

*Air bomb test at 148.9° C. (300° F.) under 80 lbs. air pressure for 5 hours*

| Product | Tensile strength | Percent elongation | In tensile strength | In elongation |
|---|---|---|---|---|
| Vulcanized rubber compound made in accordance with this invention | 2,175 | 485 | | |
| Same compound after 5 hours in air bomb at 148.9° C. under 80 lbs. air pressure | 1,713 | 420 | 21.2 | 13.4 |

*Water absorption test, 7 days in distilled water, temp. 69°–71° C.*

| Sample | Water absorption in grams per square inch |
|---|---|
| Rubber compound made in accordance with this invention, unaged | 0.0018 |
| Rubber compound made in accordance with this invention, after being aged in oxygen bomb for 336 hours | 0.0073 |
| Sample No. 1 rubber compound made with ordinary crude rubber, unaged | 0.0285 |
| Sample No. 2 of rubber compound made with ordinary crude rubber, unaged | 0.0179 |
| Sample No. 2 of rubber compound made with ordinary crude rubber after being aged in oxygen bomb for 336 hours | 0.0239 |

Because of its characteristic super-aging and heat- and moisture-resisting properties, not heretofore combined in any known rubber compound used in insulating electrical conductors and cables, rubber insulation made by practicing this invention has varied commercial applications. Its moisture-resisting properties make it especially suitable for non-leaded submarine cable, braided cable in wet conduits, and similar applications where moisture is or may be present during service use of the insulated conductor. Because of its characteristic super-aging and heat-resisting properties, it is adapted for use in manufacturing station and apparatus cables, transformer and motor leads, and for general power applications where the cable insulation may be subjected at time to temperatures of the order of about 75° to 85° C. Electrical conductors and cables insulated with a product of this invention may be used under conditions in which either a high degree of resistance to moisture, or a superior resistance to aging and heat, or an outstanding resistance to aging, to heat and to moisture is a requisite of the insulation.

The term "heat-resisting" as used herein means that property of rubber compositions of resisting, for a prolonged period of time, the combined deteriorating action of heat and air to which such composition may be exposed. We use the term "super-aging" as in common usage by rubber technologists and by which is commonly meant the power or capacity of a rubber composition to resist deterioration to an outstanding degree. By the term "deprotenized rubber" as used herein we mean rubber which has been treated to solubilize protein substances contained in crude rubber, which solubilized substances are subsequently removed from the treated rubber.

What we claim as new and desire to secure by Letters Patent of the United States, is:—

1. A vulcanized rubber insulating compound which is the product of vulcanizing a mixture consisting essentially, by weight, of 33 to 38 parts deproteinized rubber, 28 to 33 parts finely divided zinc oxide, 26 to 31 parts finely divided inert filler, and not more than 8 parts of other rubber compounding substances, one of which is an anti-oxidant and another of which is an organic compound capable of yielding nascent sulfur at vulcanization temperature, said rubber compound in a vulcanized state having an initial tensile strength of at least 1500 pounds per square inch and an initial elongation of at least 400 per cent before breaking, showing a depreciation from that of the original vulcanized compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C.

2. A vulcanized rubber insulating compound having an initial tensile strength of at least 1500 pounds per square inch and an initial elongation of at least 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C., said compound being the product of vulcanizing a mixture consisting essentially, by weight, of 33 to 38 parts deproteinized rubber, 28 to 33 parts finely divided zinc oxide, 26 to 31 parts finely divided inert filler, and 2.5 to 8 parts anti-oxidant, plasticizer and thiuram polysulfide.

3. A vulcanized rubber insulating compound having an initial tensile strength of at least 1500 pounds per square inch and an initial elongation of at least 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C., said compound being the product of heating at a vulcanizing temperature a mix consisting essentially of the following ingredients within the stated range of proportions:

| | Parts by weight |
|---|---|
| Deproteinized rubber | 33.0–38.0 |
| Finely divided zinc oxide | 28.0–33.0 |
| Finely divided clay | 26.0–31.0 |
| Anti-oxidant | 1.0– 3.0 |
| Plasticizer | 0.5– 2.5 |
| Thiuram polysulfide | 1.0– 2.5 |

4. Electrical insulation comprising a vulcanized rubber compound having an initial tensile strength not less than 2000 pounds per square inch and an initial elongation not less than 400 per cent before breaking, showing a depreciation from that of the original compound of not more than 25 per cent in elongation and in tensile strength after heating in an air-bomb for 5 hours under a pressure of 80 pounds per square inch at about 148.9° C. (300° F.), and having a moisture-absorption factor of not more than 0.01 gram per square inch of exposed surface area after immersion for 7 days in distilled water at 69° to 71° C., said compound being the product of heating at vulcanization temperature a vulcanizable rubber compound composed essentially of the following ingredients within the stated range of proportions:

| | Parts by weight |
|---|---|
| Deproteinized rubber | 33.0–38.0 |
| Finely divided zinc oxide | 28.0–33.0 |
| Finely divided clay | 26.0–31.0 |
| Anti-oxidant | 1.0– 3.0 |
| Plasticizer | 0.5– 2.5 |
| Tetra-methyl-thiuram disulfide | 1.0– 2.5 |

5. An insulated electrical conductor comprising a conducting core insulated with a vulcanized rubber insulating compound having an initial tensile strength of at least 1500 pounds per square inch and an initial elongation of at least 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C., said compound being the product of vulcanizing a vulcanizable rubber compound composed essentially, by weight, of 33 to 38 parts deproteinized rubber, 28 to 33 parts finely divided zinc oxide, 26 to 31 parts finely divided inert filler, and not more than 8 parts of other rubber compounding substances one of which is an anti-oxidant and another of which is an organic compound capable of yielding nascent sulfur at vulcanization temperature.

6. An insulated electrical conductor comprising in combination a metallic conductor and an insulating rubber covering obtained by vulcanizing a mixture consisting essentially of the following ingredients within the stated range of proportions:

| | Parts by weight |
|---|---|
| Deproteinized rubber | 33.0–38.0 |
| Finely divided zinc oxide | 28.0–33.0 |
| Finely divided clay | 26.0–31.0 |
| Anti-oxidant | 1.0– 3.0 |
| Plasticizer | 0.5– 2.5 |
| Tetra-methyl-thiuram disulfide | 1.0– 2.5 | said covering having an initial tensile strength not less than 2000 pounds per square inch and an initial elongation not less than 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C.

7. A process of making a vulcanized rubber insulating compound having an initial tensile strength of at least 1500 pounds per square inch and an initial elongation of at least 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C., said process comprising forming a substantially uniform mixture consisting essentially, by weight, of 33 to 38 parts deproteinized rubber, 28 to 33 parts zinc oxide, 26 to 31 parts finely divided clay, 1 to 3 parts anti-oxidant and 0.5 to 2.5 parts plasticizer, aging the said mixture, incorporating into the aged mixture 1 to 2.5 parts thiuram polysulfide, and heating the resulting compound at a temperature and for a period of time sufficient to vulcanize said compound.

8. A process of insulating an electrical conductor with a vulcanized rubber compound having an initial tensile strength of at least 1500 pounds per square inch and an initial elongation of at least 400 per cent before breaking, showing a depreciation from that of the original compound of not more than 25 per cent in elongation and in tensile strength after heating in an air-bomb for 20 hours under a pressure of 80 pounds per square inch at about 126.7° C. (260° F.) or after similarly heating for 5 hours under a pressure of 80 pounds per square inch at about 148.9° C. (300° F.), and having a moisture-absorption factor of not more than 0.01 gram per square inch of exposed surface area after immersion for 7 days in distilled water maintained at 69° to 71° C., said process comprising forming a substantially uniform mixture composed essentially, by weight, of 33 to 38 parts deproteinized rubber, 28 to 33 parts finely divided zinc oxide, 26 to 31 parts finely divided clay, 1 to 3 parts anti-oxidant and 0.5 to 2:5 parts plasticizer, aging the said mixture, incorporating the aged mixture 1 to 2.5 parts tetra-methyl-thiuram disulfide, applying the resulting rubber compound to an electrical conductor as insulation therefor, and vulcanizing the rubber in place on the conductor.

EMIL W. SCHWARTZ.
MANUEL H. SAVAGE.
FRANCIS C. SPARGO.